No. 702,419. Patented June 17, 1902.
G. GIOVANNA.
PARER AND CUTTER.
(Application filed June 1, 1901.)
(No Model.)

WITNESSES:
J. Sugar
P. McComb.

INVENTOR
George Giovanna
BY
J. J. Sugar
ATTORNEY

THE NORRIS PETERS CO., PHOTO-LITHO., WASHINGTON, D. C.

UNITED STATES PATENT OFFICE.

GEORGE GIOVANNA, OF NEW YORK, N. Y.

PARER AND CUTTER.

SPECIFICATION forming part of Letters Patent No. 702,419, dated June 17, 1902.

Application filed June 1, 1901. Serial No. 62,723. (No model.)

*To all whom it may concern:*

Be it known that I, GEORGE GIOVANNA, a citizen of the United States, and a resident of New York city, county of New York, and State of New York, have invented certain new and useful Improvements in Parers and Cutters, of which the following is a specification, reference being had to the accompanying drawings, forming a part thereof, in which similar letters of reference indicate corresponding parts.

My invention relates to an improved fruit and vegetable parer and cutter, and is particularly designed as a potato parer and cutter.

The object of my invention is to provide a device of the nature described of simple construction and embodying economy in cost of manufacture. I attain this object by the device illustrated in the accompanying drawings, in which—

Figure 1:
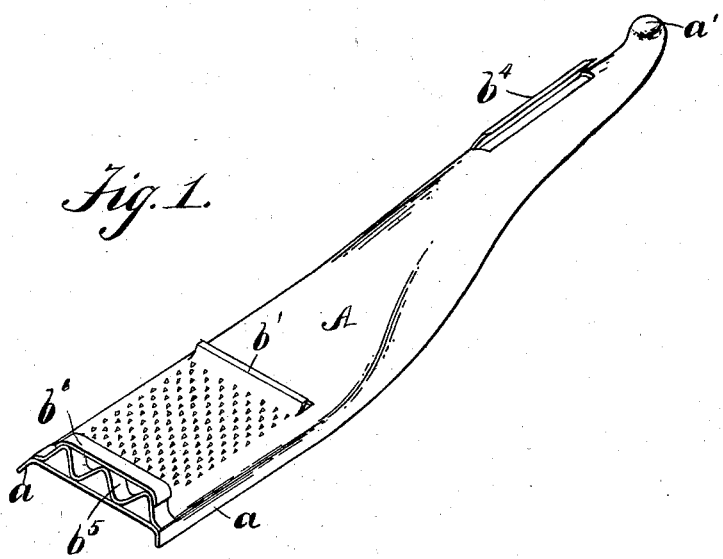
Figure 2:
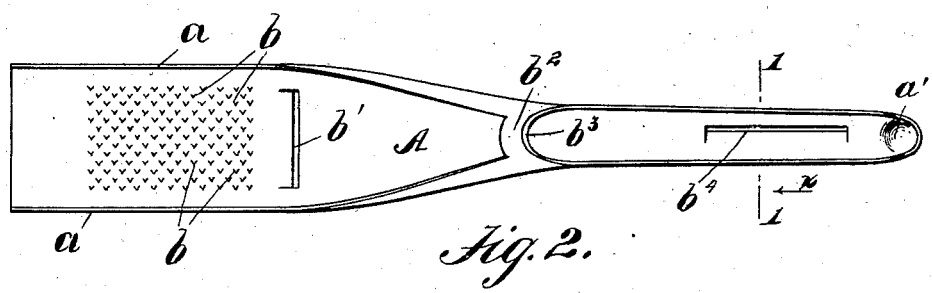
Figure 3:
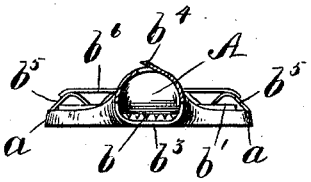

Figure 1 is a perspective view of my device. Fig. 2 is a bottom view of same, and Fig. 3 is a sectional view through line 1-1 of Fig. 2 looking in the direction indicated by the arrow X.

In practice the body or main portion of my device is formed of one piece of sheet metal A, flat at one end, with flanged sides $a$. The flat portion extends about one-third the length of the device and tapers to the opposite end, which is formed semicircular in section and terminates in a cupped end $a'$. The flat portion is provided on its under side with a series of sharp projections $b$, formed by suitable perforations. A projecting lip $b'$, having a knife-edge, is also formed upon the flat portion. A strip $b^2$, having a knife-edge at $b^3$, connects the two flanged sides of the device near the end of the tapered portion, and a cutting-lip $b^4$ is formed upon the device near the cupped end $a'$. At the extreme end of the flat portion I provide a corrugated blade $b^5$, having a flat blade $b^6$, secured thereto. These blades have a sharpened inner edge.

In the use of my device the blade $b^4$ is adapted for ordinary paring, while the cupped end is designed to remove eyes or objectionable spots from the vegetable or fruit upon which the device is being used. The blade $b'$ is adapted to cut slices, while the circular blade $b^3$ is adapted to cut long slices in section, and the corrugated and flat blades $b^5$ and $b^6$ are designed to cut long strips specially adapted for cooking. The roughened surface formed by the perforations is intended to be used as a grater or scraper.

Having thus described my invention, what I claim as new, and desire to secure by Letters Patent, is—

In a fruit or vegetable parer and cutter, a body having a flattened-shank formation at one end and a semitubular formation at its opposite end, a corrugated blade secured upon, and extending across the said flattened shank and a straight blade secured upon the said corrugated blade, substantially as described.

In testimony that I claim the foregoing as my invention I have signed my name, in presence of two witnesses, this 4th day of March, 1901.

GEORGE GIOVANNA.

Witnesses:
S. S. SUGAR,
B. McCOMB.